United States Patent
Chen et al.

(10) Patent No.: US 11,022,730 B2
(45) Date of Patent: Jun. 1, 2021

(54) LENS MODULE WITH IMPROVED IMAGE QUALITY AND ELECTRONIC DEVICE WITH THE SAME

(71) Applicant: TRIPLE WIN TECHNOLOGY(SHENZHEN) CO. LTD., Shenzhen (CN)

(72) Inventors: Shin-Wen Chen, New Taipei (TW); Jian-Chao Song, Guangdong (CN); Jing-Wei Li, Guangdong (CN); Sheng-Jie Ding, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 187 days.

(21) Appl. No.: 16/384,133

(22) Filed: Apr. 15, 2019

(65) Prior Publication Data
US 2020/0209441 A1    Jul. 2, 2020

(30) Foreign Application Priority Data
Jan. 2, 2019  (CN) .......................... 201910003819.6

(51) Int. Cl.
*G02B 5/02* (2006.01)
*H04N 5/225* (2006.01)

(52) U.S. Cl.
CPC ......... *G02B 5/0284* (2013.01); *G02B 5/0221* (2013.01); *H04N 5/2253* (2013.01); *H04N 5/2254* (2013.01)

(58) Field of Classification Search
CPC .. G02B 5/0284; G02B 5/0221; G02B 5/0205; G02B 5/021; G02B 5/0215; G02B 5/0231; G02B 5/0273; H04N 5/2253; H04N 5/2254
USPC .................. 359/599, 601, 609, 613, 614
See application file for complete search history.

(56) References Cited

U.S. PATENT DOCUMENTS

| | | | | |
|---|---|---|---|---|
| 4,196,994 A | * | 4/1980 | de Jesus | G01D 5/34715 250/231.14 |
| 4,990,782 A | * | 2/1991 | Wellman | F25B 21/02 250/352 |
| 7,502,170 B2 | * | 3/2009 | Nakano | G01N 21/8806 359/627 |
| 10,648,853 B2 | * | 5/2020 | Wan | G02B 7/021 |

FOREIGN PATENT DOCUMENTS

| | | |
|---|---|---|
| CN | 206743372 U | 12/2017 |
| CN | 108520886 A | 9/2018 |
| CN | 208239703 U | 12/2018 |

* cited by examiner

*Primary Examiner* — Arnel C Lavarias
(74) *Attorney, Agent, or Firm* — ScienBiziP, P.C.

(57) ABSTRACT

A lens module with enhanced absorption of stray light includes a sensor and a mounting bracket. The sensor includes a photosensitive area and a non-photosensitive area arranged surrounding the photosensitive area. The sensor is received in the mounting bracket and a window is defined in the mounting bracket. An annular flange extends from an inner wall of the window towards a center axis of the window. The annular flange includes a reflecting surface facing away from the inner wall of the window and tilted towards the sensor. The photosensitive area is exposed in a through hole of the annular flange. Diffusing reflection structures are formed on the reflecting surface and are configured to diffuse light incident on the non-photosensitive area away from the photosensitive area.

20 Claims, 7 Drawing Sheets

LENS MODULE WITH IMPROVED IMAGE QUALITY AND ELECTRONIC DEVICE WITH THE SAME

FIELD

The subject matter of the application generally relates to imaging.

BACKGROUND

Electronic devices, such as cell phones or tablet computers, include lens modules for capturing images. The lens module includes a lens, a filter, a sensor, a mounting bracket, and a circuit board. When the lens module is used in an environment with strong light, light of certain angles may strike an inner wall of the mounting bracket and be repeatedly reflected inside the mounting bracket. When the reflected light is incident on the sensor, stains may appear in images, thus lowering the imaging quality.

Thus, light absorption by ink printing or similar at the edge of the filter is needed to prevent light from entering the mounting bracket. However, in order to improve light blocking effects, it is necessary to increase the area of the printing ink, which increases the size of the filter and the production cost of the lens module. Furthermore, the lens module may also generate a dark angle, which further reduces the imaging quality of the lens module.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
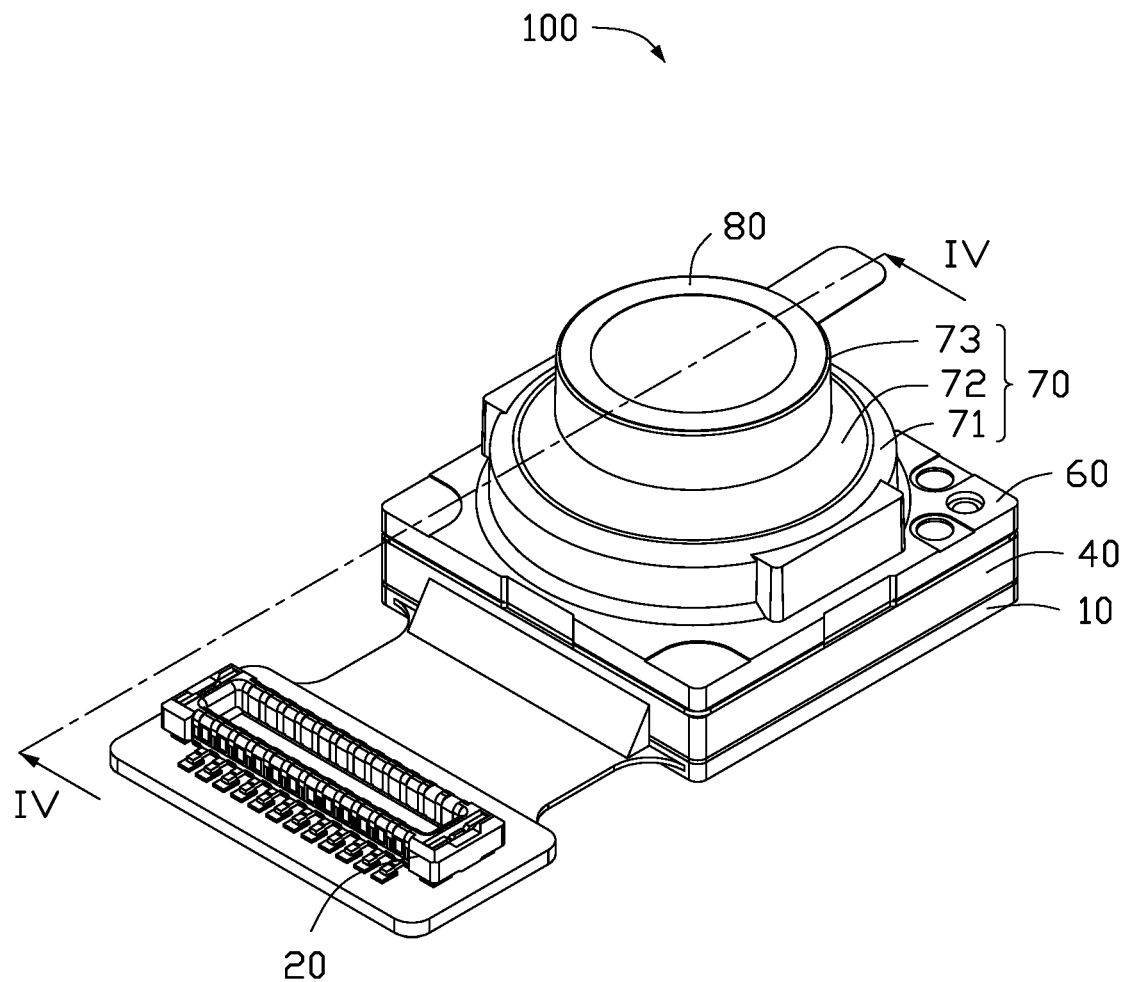
FIG. 1 is a perspective view of a first embodiment of a lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
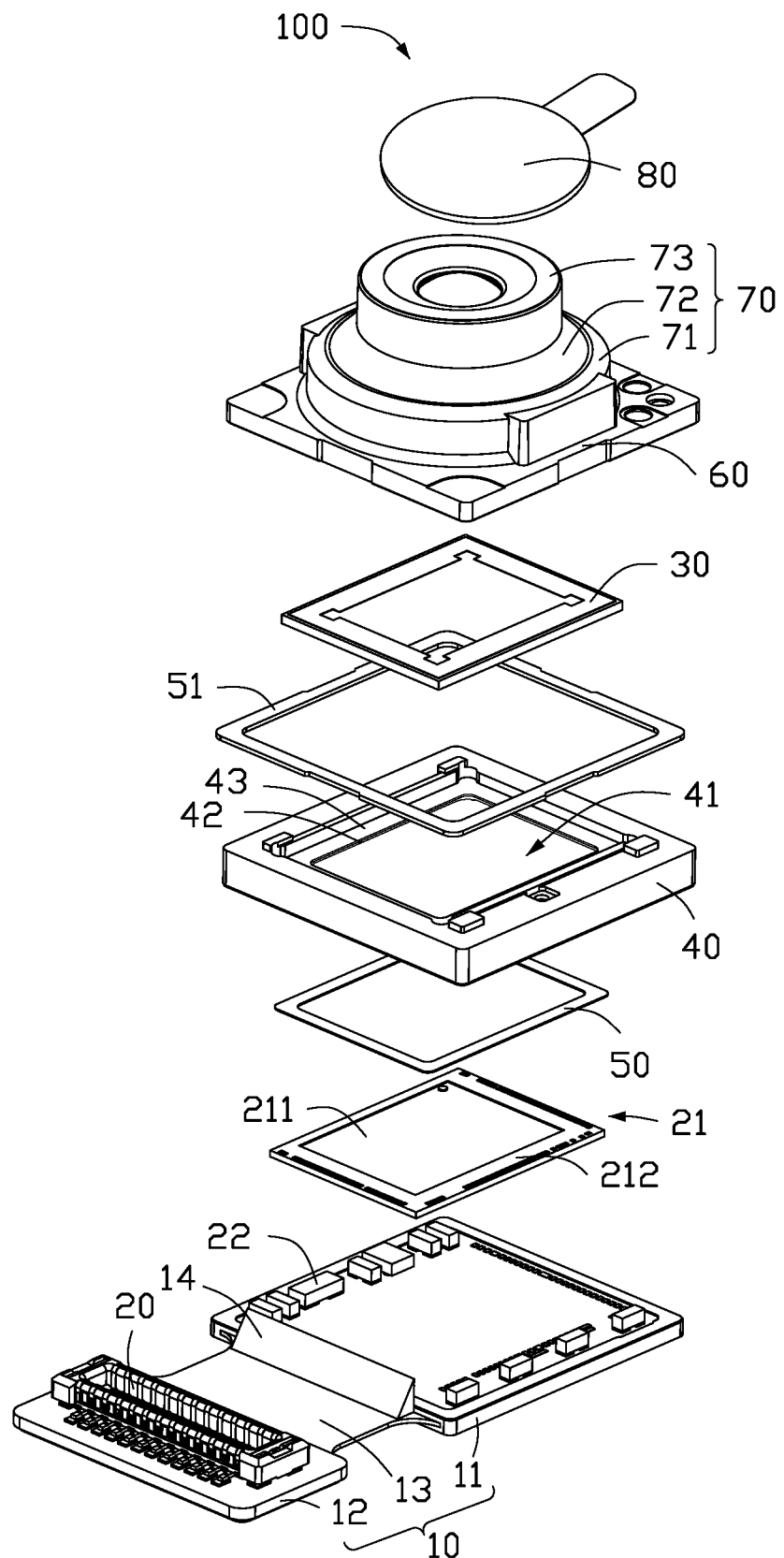
FIG. 2 is an exposed view of the camera module of FIG. 1.
Figure 3:
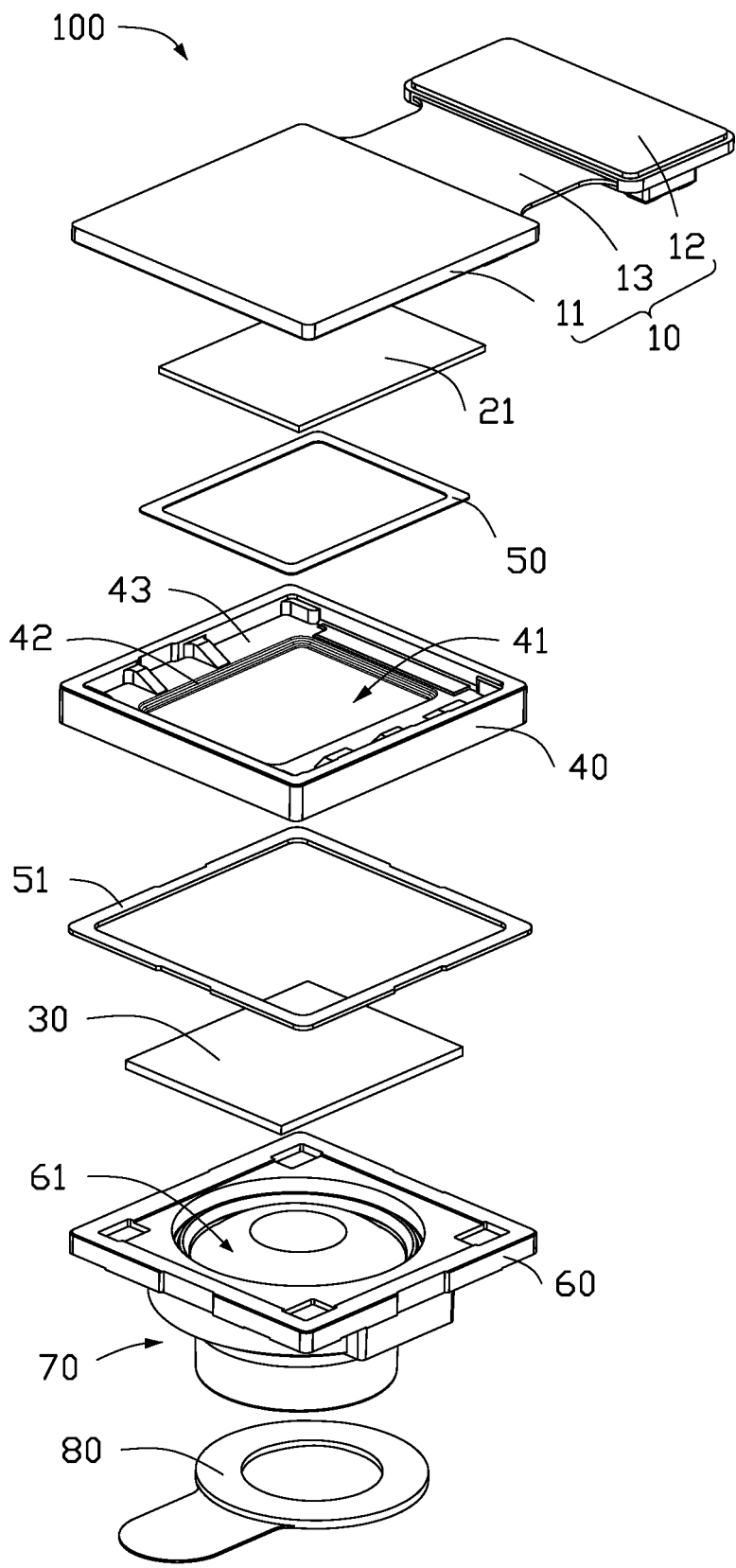
FIG. 3 is similar to FIG. 2, but showing the lens module from another angle.

FIGS. 1-3 show a lens module 100 of the present disclosure. The lens module 100 includes a printed circuit board 10, an optical filter 30, a mounting bracket 40, a lens base 60, and a lens 70.

In at least one embodiment, the printed circuit board 10 may be a flexible printed circuit board, a rigid printed circuit board, a rigid-flex printed circuit board, or the like. In at least one embodiment, the printed circuit board 10 is a rigid-flex printed circuit board. The printed circuit board 10 includes a first rigid portion 11, a second rigid portion 12, and a flexible portion 13. The flexible portion 13 is located between the first rigid portion 11 and the second rigid portion 12. An electrical connection portion 20 is mounted on the second rigid portion 12. The electrical connection portion 20 is configured to implement signal transmission between the lens module 100 and an electronic device (not shown). The electrical connection portion 20 may be an edge connector (gold fingers) or other connector.

A sensor 21 and a plurality of electronic components 22 are all mounted on the first rigid portion 11. The sensor 21 and the plurality of electronic components 22 are electrically connected to the printed circuit board 10. The sensor 21, the plurality of electronic components 22, and the electrical connection portion 20 are on a same surface of the printed circuit board 10. The plurality of electronic components 22 may comprise a resistance, a capacitance, a diode, a triode, a relay, a live erasable programmable read-only memory (EEPROM), and other passive components.

Figure 4:
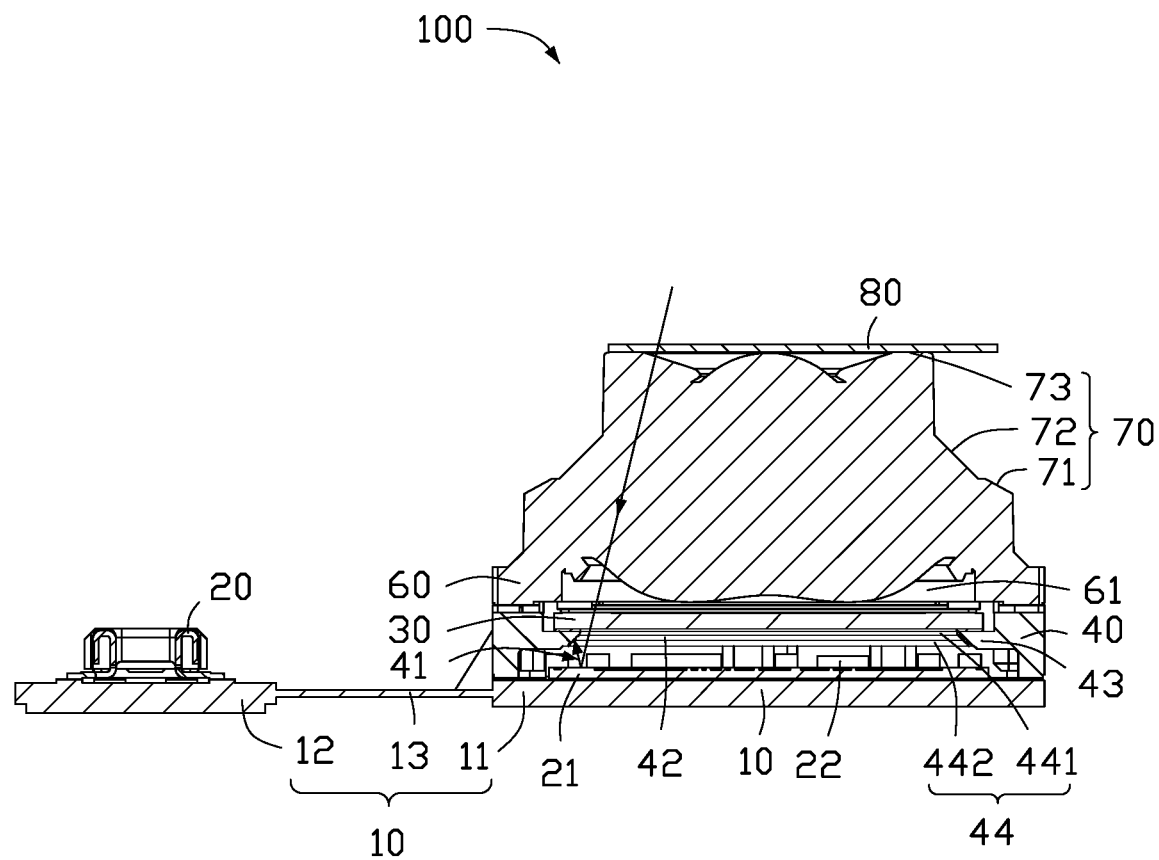
FIG. 4 is a cross-section view along line IV-IV of FIG. 1.
Figure 5:
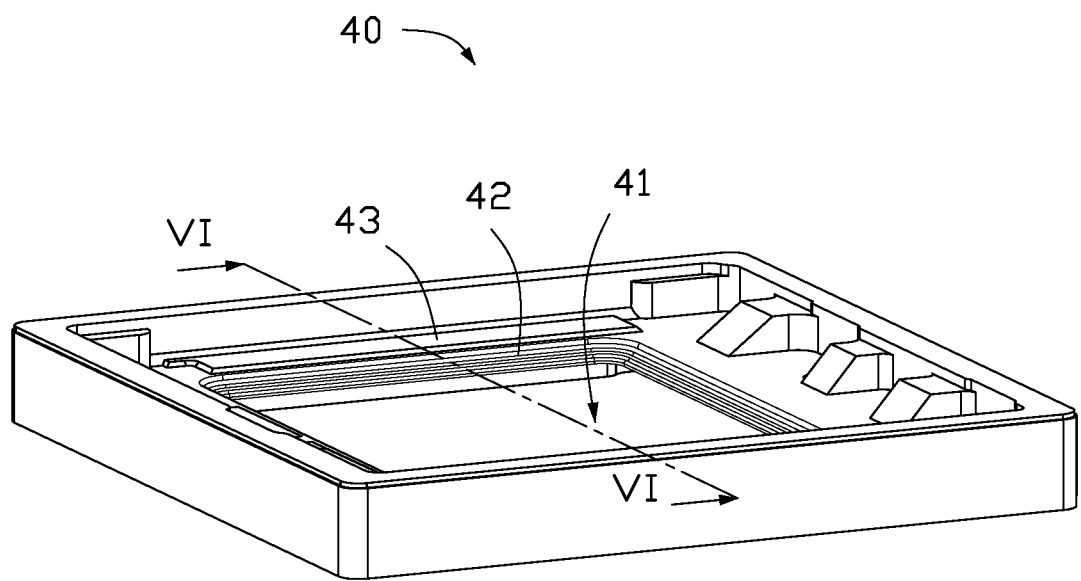
FIG. 5 is a perspective view of a mounting bracket of the lens module of FIG. 3.
Figure 6:
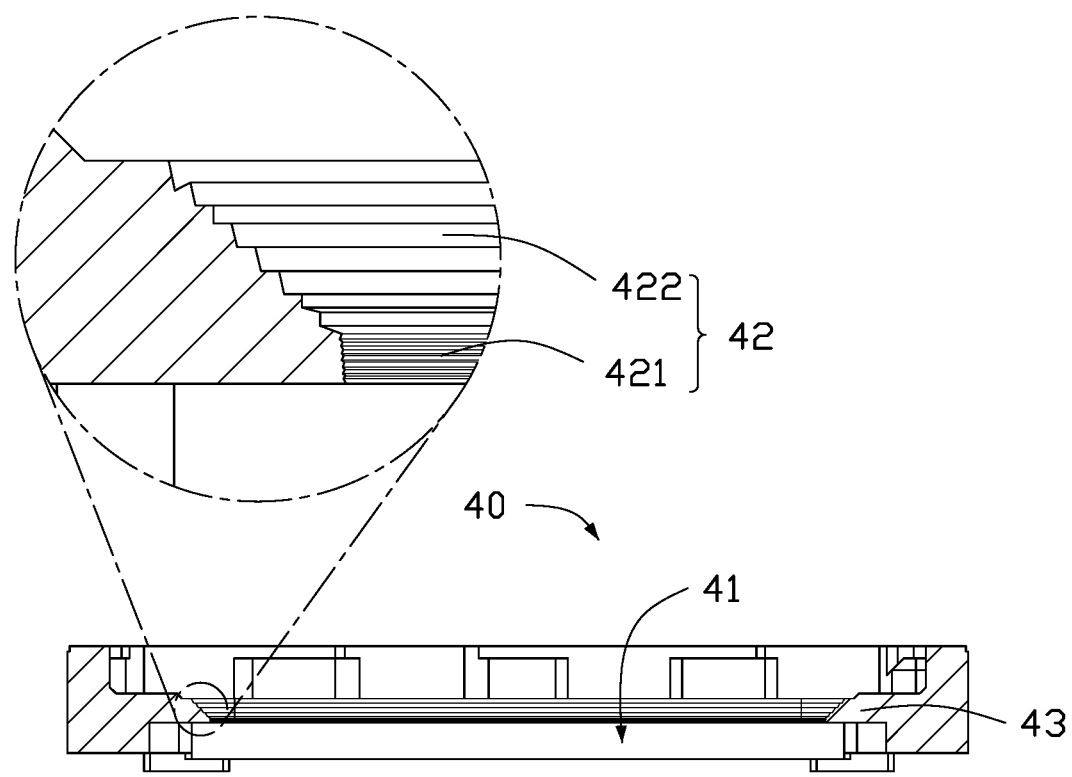
FIG. 6 is a cross-section view along line VI-VI of FIG. 5.

In FIGS. 4-6, the mounting bracket 40 is mounted on the first rigid portion 11 of the printed circuit board 10 by a first adhesive layer 50. The mounting bracket 40, the sensor 21, the electronic components 22, and the electrical connection portion 20 are on a same surface of the printed circuit board 10. The mounting bracket 40 is roughly rectangular and hollow. A window 41 is defined in the mounting bracket 40. The window 41 runs through the mounting bracket 40. The window 41 is roughly rectangular. The window 41 has a center axis (not shown). An annular flange 43 extends from the inner wall of the window 41 towards the center axis of the window 41. The annular flange 43 has a through hole (not shown) for light. The through hole has a center axis that is overlapped to the center axis of the window 41.

The sensor 21 includes a photosensitive area 211 exposed in the through hole of the annular flange 43 and a non-photosensitive area 212 arranged surrounding the photosensitive area 211.

The annular flange 43 includes a reflecting surface 44. The reflecting surface 44 faces away from the inner wall of the window and is tilted towards the sensor 21 (in FIG. 4). Diffusing reflection structures 42 are formed on the reflecting surface 44. In at least one embodiment, the diffusing reflection structures 42 are screw threads. In other embodiments, the diffusing reflection structures 42 may be at least one of sawteeth, micropores, and the like.

The reflecting surface 44 includes a plane area 441 away from the sensor 21 and an inclined area 442 abutting against the sensor 21. The inclined area 442 connects to the plane area 441 and faces the sensor 21. The inclined area 442 is longer than the plane area 441. The plane area 441 is parallel to a center axis of the window 41. The inclined area 442 is inclined relative to the center axis of the window 41. The diffusing reflection structures 42 include first diffuse reflection portions 421 and second diffuse reflection portions 422. The first diffuse reflection portions 421 are formed on the plane area 441. The second diffuse reflection portions 422 are formed on the inclined area 442. The annular flange 43 divides the window 41 into a first opening area (not shown) and a second opening area (not shown). The first opening area abuts the sensor 21. The second opening area is away from the sensor 21. The sensor 21 is received in the first opening area. The optical filter 30 is mounted on the annular flange 43 and received in the second opening area. External light incident on the non-photosensitive area 212 through the optical filter 30 is reflected by the non-photosensitive area 212 to the inclined area 442 and the plane area 441, and is reflected and diffused on the second diffuse reflection portions 422 and the first diffuse reflection portions 421. This prevents the sensor 21 from generating stains on images and improves the imaging quality of the lens module 100.

In other embodiments, the first diffuse reflection portions 421 or the second diffuse reflection portions 422 may be omitted.

In other embodiments, the plane area 441 or the inclined area 442 may be omitted.

The lens module 100 further includes a stiffening adhesive 14. The stiffening adhesive 14 is formed on the flexible portion 13 of the printed circuit board 10 and the mounting bracket 40. The stiffening adhesive 14, the sensor 21, the electronic components 22, and the electrical connection portion 20 are on a same surface of the printed circuit board 10. The stiffening adhesive 14 enhances the structural strength of the lens module 100.

The lens base 60 is mounted on the mounting bracket 40 by a second adhesive layer 51. A receiving hole 61 is defined in the lens base 60. The lens 70 is received in the receiving hole 61.

The lens base 60 is made of metal or plastic. In at least one embodiment, the lens base 60 is made of an aluminum alloy.

The lens 70 and the lens base 60 are assembled or integrally formed. In the embodiment, the lens 70 and the lens base 60 are integrally formed.

The lens 70 includes a first lens portion 71, a second lens portion 72, and a third lens portion 73. The second lens portion 72 connects to the first lens portion 71 and the third lens portion 73. Diameters of the first lens portion 71, the second lens portion 72, and the third lens portion 73 sequentially decrease. The first lens portion 71, the second lens portion 72, and the third lens portion 73 are assembled or integrally formed. In the embodiment, the first lens portion 71, the second lens portion 72, and the third lens portion 73 are integrally formed.

In at least one embodiment, the lens module 100 further includes a protective cap 80 covering the third lens portion 73 of the lens 70. The protective cap 80 is facing away from the lens base 60. The protective cap 80 prevents dust and other contaminants settling on the lens 70.

Figure 7:
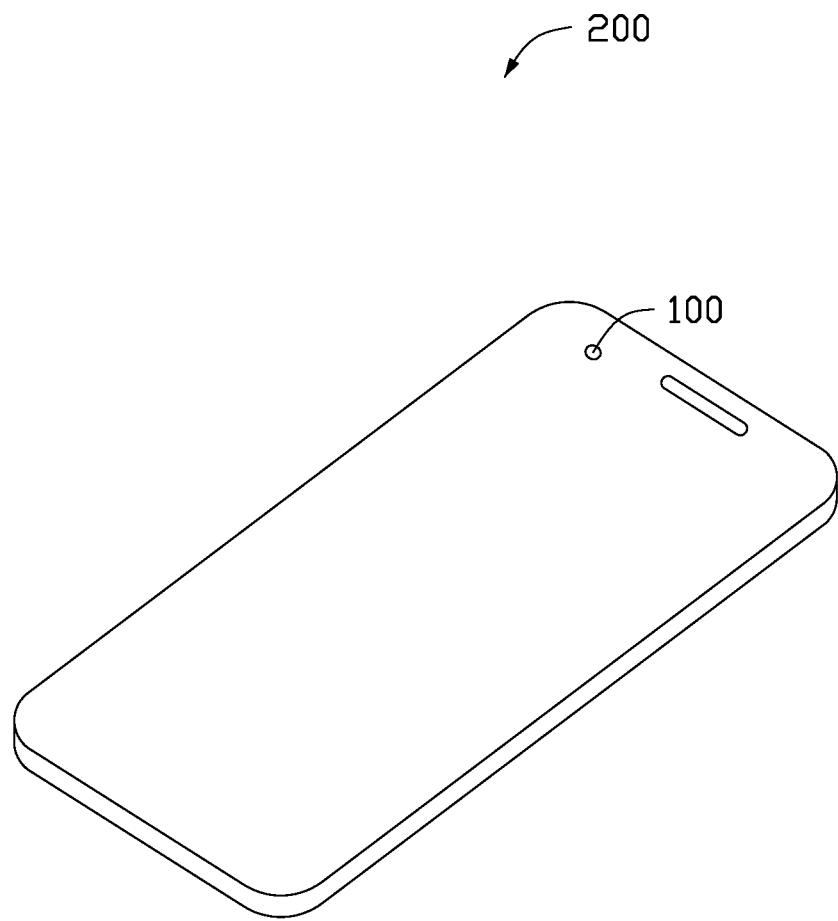
FIG. 7 is a perspective view of an electronic device with the lens module of FIG. 1.

FIG. 7 shows an electronic device 200 of the present disclosure, the electronic device 200 includes the lens module 100. The electronic device 200 can be mobile phone, wearable device, vehicle camera, surveillance device, or the like. In at least one embodiment, the electronic device 200 is a mobile phone.

With the embodiments described above, the first diffuse reflection portions 421 formed on the plane area 441 of the reflecting surface 44 and the second diffuse reflection portions 422 formed on the inclined area 442 of the reflecting surface 44 reflect external light from the non-photosensitive area 212 onto the inclined area 442 and the plane area 441. The external light is diffused and reflected on the second diffuse reflection portions 422 and the first diffuse reflection portions 421, thereby preventing the sensor 21 from receiving stray light, thereby improving the imaging quality of the lens module 100.

The embodiments shown and described above are only examples. Many details are often found in the art such as the other features of a lens module with improved image quality and an electronic device with the same. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A lens module comprising:
a sensor; wherein the sensor comprises a photosensitive area and a non-photosensitive area arranged surrounding the photosensitive area; and
a mounting bracket, wherein the sensor is received in the mounting bracket, a window is defined in the mounting bracket, an annular flange extends from an inner wall of the window towards a center axis of the window, the annular flange comprises a reflecting surface facing away from the inner wall of the window and tilted towards the sensor; the photosensitive area is exposed in a through hole of the annular flange; a plurality of diffusing reflection structures is formed on the reflecting surface; the plurality of diffusing reflecting structures are configured to diffuse light incident on the non-photosensitive area away from the photosensitive area.

2. The lens module of claim 1, wherein a shape of the plurality of diffusing reflection structures is screw threads, sawteeth, or micropores.

3. The lens module of claim 1, wherein the reflecting surface comprises a plane area away from the sensor, the plane area is parallel to the center axis of the window, the plurality of diffusing reflection structures comprises a plurality of first diffuse reflection portions, and the first diffuse reflection portions are formed on the plane area.

4. The lens module of claim 3, wherein the reflecting surface further comprises an inclined area abutting against the sensor, the inclined area connects to the plane area, the inclined area is inclined relative to the center axis of the window and faces the sensor, the plurality of diffusing reflection structures further comprises a plurality of second diffuse reflection portions, and the plurality of second diffuse reflection portions is formed on the inclined area.

5. The lens module of claim 1, wherein the reflecting surface comprises an inclined area abutting the sensor, the inclined area is inclined relative to the center axis of the window and faces the sensor, the plurality of diffusing reflection structures comprises a plurality of second diffuse reflection portions, and the plurality of second diffuse reflection portions is formed on the inclined area.

6. The lens module of claim 1, wherein the sensor is received in the annular flange, the lens module further comprises an optical filter, and the optical filter is received in the annular flange and opposite to the sensor.

7. The lens module of claim 1, wherein the lens module further comprises a printed circuit board; each of the mounting bracket and the sensor is mounted on the printed circuit board; the sensor is electrically connected to the printed circuit board.

8. The lens module of claim 7, wherein the mounting bracket is mounted on the printed circuit board by a first adhesive layer.

9. The lens module of claim 7, wherein the printed circuit board comprises a first rigid portion, a second rigid portion, and a flexible portion, the flexible portion is located between the first rigid portion and the second rigid portion, and an electrical connection portion is mounted on the second rigid portion; the first rigid portions is configure to mount a plurality of electronic components, the plurality of electronic components are electrically connected to the printed circuit board; the sensor, the electronic components, and the electrical connection portion are on a same surface of the printed circuit board.

10. The lens module of claim 1, wherein the lens module further comprises a lens base and a lens, the lens base is mounted on the mounting bracket, and the lens is mounted on the lens base.

11. The lens module of claim 1, wherein the lens module further comprises a protective cap, the protective cap covers the lens.

12. An electronic device comprising:
a lens module comprising:
a sensor; wherein the sensor comprises a photosensitive area and a non-photosensitive area arranged surrounding the photosensitive area; and
a mounting bracket, wherein the sensor is received in the mounting bracket, a window is defined in the mounting bracket, an annular flange extends from an inner wall of the window towards a center axis of the window, the annular flange comprises a reflecting surface facing away from the inner wall of the window and tilted towards the sensor, the photosensitive area exposes in a light through hole of the annular flange; a plurality of diffusing reflection structures is formed on the reflecting surface; the plurality of diffusing reflecting structures are configured to diffuse light incident on the non-photosensitive area away from the photosensitive area.

13. The electronic device of claim 12, wherein a shape of the plurality of diffusing reflection structures is screw threads, sawteeth, or micropores.

14. The electronic device of claim 12, wherein the reflecting surface comprises a plane area away from the sensor, the plane area is parallel to the center axis of the window, the plurality of diffuse reflection structure comprises a plurality of first diffuse reflection portions, and the first diffuse reflection portions are formed on the plane area.

15. The electronic device of claim 14, wherein the reflecting surface further comprises an inclined area abutting the sensor; the inclined area connects to the plane area; the inclined area is inclined relative to the center axis of the window and faces the sensor; the plurality of diffusing reflection structures further comprises a plurality of second diffuse reflection portions; the plurality of second diffuse reflection portions is formed on the inclined area.

16. The electronic device of claim 12, wherein the reflecting surface comprises a inclined area abutting the sensor; the inclined area is inclined relative to the center axis of the window and faces the sensor; the plurality of diffusing reflection structures comprises a plurality of second diffuse reflection portions; the plurality of second diffuse reflection portions is formed on the inclined area.

17. The electronic device of claim 12, wherein the sensor is received in the annular flange, the lens module further comprises an optical filter, and the optical filter is received in the annular flange and opposite to the sensor.

18. The electronic device of claim 12, wherein the lens module further comprises a printed circuit board; each of the mounting bracket and the sensor is mounted on the printed circuit board; the sensor is electrically connected to the printed circuit board.

19. The electronic device of claim 12, wherein the lens module further comprises a lens base and a lens, the lens base is mounted on the mounting bracket, and the lens is mounted on the lens base.

20. The electronic device of claim 12, wherein the lens module further comprises a protective cap, the protective cap covers on the lens.

* * * * *